Patented June 9, 1931

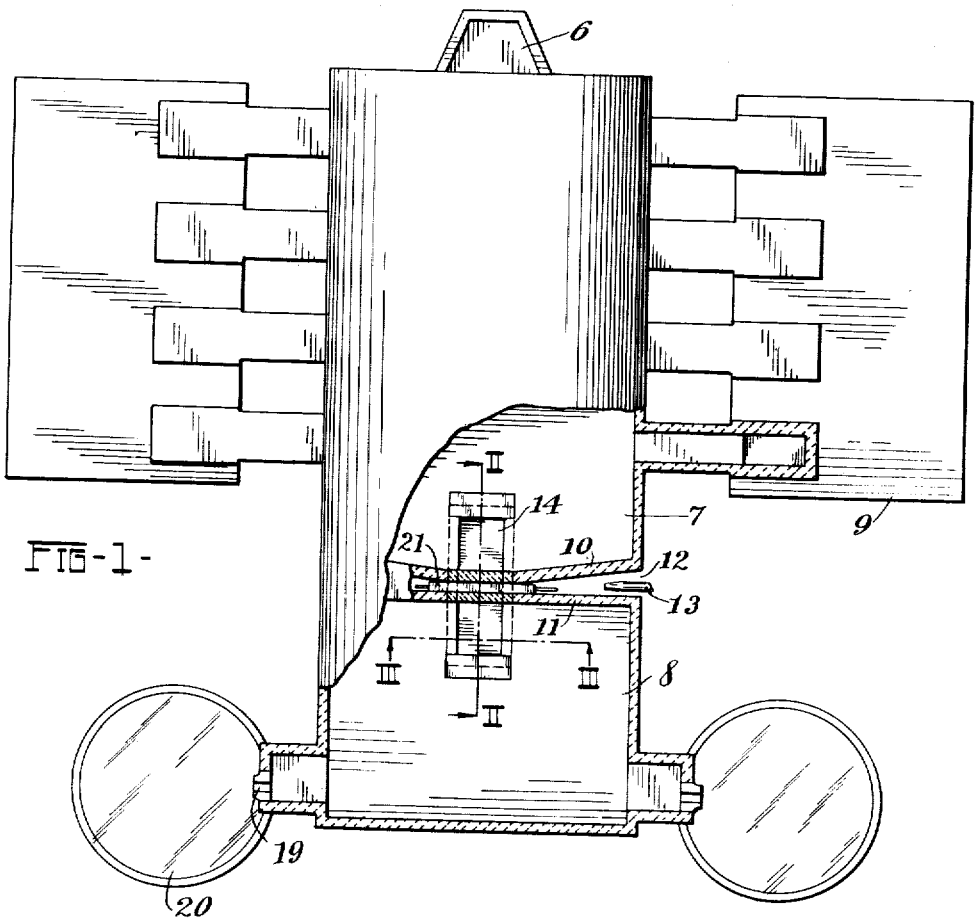
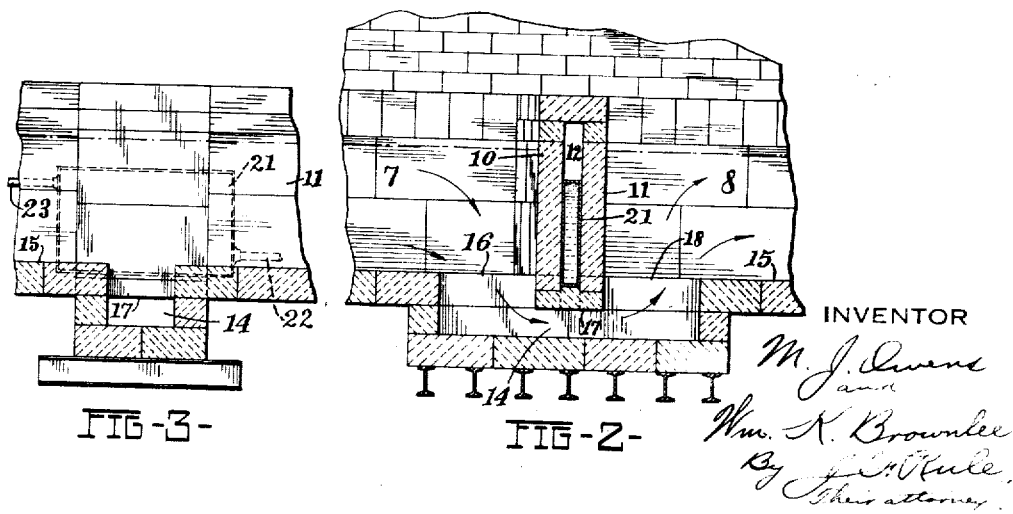

1,809,105

UNITED STATES PATENT OFFICE

WILLIAM K. BROWNLEE AND MICHAEL J. OWENS, OF TOLEDO, OHIO; SAID OWENS ASSIGNOR TO OWENS-ILLINOIS GLASS COMPANY, OF TOLEDO, OHIO, A CORPORATION OF OHIO

FURNACE

Application filed May 11, 1923. Serial No. 638,272.

Our invention relates to glass furnaces of the type comprising a melting tank and a refining tank separated by a wall or partition, a passageway being provided through which the melted glass passes from the melting tank to the refining tank.

In furnaces of this type, the raw materials are introduced into the melting tank and melted by surface heat supplied by heated air and gases burning in the space over the glass in the tank. During the melting process, air and gases produced by chemical reactions are incorporated in considerable quantities in the glass in the form of bubbles or "seeds." In this manner, the glass near the surface is honeycombed with air or gas bubbles. As the glass settles in the tank, these bubbles and other impurities gradually rise toward the surface, so that the lower portions of glass in the tank are comparatively clear.

It is customary to provide a passageway from the melting compartment to the refining compartment at a point below the surface of the glass, so that the glass flowing into the refining compartment is comparatively pure and free from entrained air or gases. As such passageway is above the floor of the furnace, there is a greater or less depth of the glass at a lower level than the passageway, which glass becomes comparatively cold and stagnant. The depth of the live circulating glass is correspondingly reduced. Moreover, it is found in practice that the glass in flowing through such passageway, gradually wears away the upper wall of the passage, owing to the abrasive action of the glass and also to its chemical reaction on the refractory material forming the walls of the passageway. As a result, the level at which the glass is drawn from the melting tank gradually becomes higher and higher or nearer the surface with a corresponding increase in the seediness and impurity of the glass. This condition sometimes becomes so bad that the glass cannot longer be used and a rebuilding of the furnace is necessary.

An object of our invention is to overcome the above difficulties. In accordance with our invention, there is provided a passageway leading downward from the floor of the melting tank, beneath the partition wall and upward into the refining tank. As a result, the glass is drawn from the bottom of the tank where it is purest and freest from air or gas bubbles, the full depth of the glass in the tank is utilized and the accumulation of stagnant glass or dog metal is prevented.

Associated with the passageway between the melting and refining tanks there is provided cooling means comprising a water tank or compartment built within the partition wall above the passageway. This serves to keep down the temperature of the upper wall of said passageway, so that the rate at which the upper wall of the passage is worn, is reduced to a minimum. Moreover, it is found that if the refractory material lining the cooling tank does wear away, the walls of the tank are protected from wear by a coating of glass which freezes to said walls. As a result, the possibility of the glass wearing through the walls of the cooling tank is eliminated and the wearing away of the channel in an upward direction absolutely limited. As the lower surface of the cooling tank is preferably at or below the level of the floors of the furnace, there is provided means for permanently maintaining the passageway between the melting and refining tanks below the floor level of said tanks.

Other objects of the invention will appear hereinafter.

In the accompanying drawings:

Figure 1 is a part sectional plan view of a glass furnace constructed in accordance with the principles of our invention.

Figure 2 is a fragmentary sectional elevation at the line II—II on Figure 1.

Figure 3 is a section at the line III—III on Figure 1.

The invention is herein shown as applied to a furnace comprising a continuous melting tank 7 into which the materials are introduced at the dog house 6 at the end of the tank, and a refining tank 8 from which the glass is withdrawn for use. A regenerative furnace 9 is provided in which the air is heated before mixing with the gases of combustion which are burned within the combustion chamber or space over the melting tank. The raw materials are gradually melted and chemically combined to form molten glass which slowly settles or moves downward is the tank as the glass flows from the bottom of the melting tank into the refining tank or compartment 8.

The melting and refining compartments are separated by a partition comprising the end wall 10 of the melting tank and the end wall 11 of the refining tank, these walls being spaced apart to provide an air space or passageway 12 through which air may circulate for preventing overheating of the walls. Blowers 13 may be provided for continuously blowing air between the furnace walls.

The molten glass flows from the melting chamber into the refining chamber through a passageway or channnel 14 below the level of the furnace floor 15. The glass enters this channel through an opening 16 in the floor of the melting tank, passes beneath the bottom blocks 17 of the partition and upward through an opening 18 in the floor of the refining tank. The refined glass may flow from the tank 8 through spouts 19 into gathering tanks 20, or may be withdrawn in any other well known or approved manner.

Embedded within the partition wall is a water tank or compartment 21, preferably made of steel, through which water is circulated for keeping down the temperature of the partition walls. The water enters the tank 21 through a pipe 22 and flows from said tank through an outlet pipe 23. The partition walls 10 and 11 and the walls of the channel 14, as well as the floor and outer walls of the furnace, are made of highly refractory clay blocks to withstand the intense heat of the furnace and molten glass.

The provision of the water pad or tank 21 within the partition wall is of importance because said wall is shut off from the cooling action of the outside air. With both sides of the partition beneath the surface of the molten glass, it would be rapidly disintegrated and worn away by the action of the glass thereon if some special means were not provided for keeping the temperature down.

It is found in practice that the bottom blocks 17 of the partition wear away more rapidly than other portions, owing to the combined chemical and abrasive action of the glass and the tendency of the moving glass to supply more heat to said surface than to the surfaces where there is less movement of the glass. The water tank 21 by its cooling action serves not only to reduce the wear of the blocks 17 which form the upper wall of the channel 14, but also positively limits the extent to which the upper wall of said channel will be worn away. This is due to the fact that even though the refractory clay blocks are worn away at this point, the steel walls of the tank are kept at such a low temperature that a coating of frozen glass is always maintained between said walls and the flowing glass, so that further wear is prevented. As the water tank extends downward to or beneath the level of the furnace floor, it will be seen that the glass must always be drawn from the bottom of the melting tank. In this manner, the full depth of the melting tank is utilized, accumulation of stagnant glass prevented and the glass is drawn from the tank where it is freest from bubbles or other impurities.

We do not limit ourselves to the particular construction herein disclosed, as modifications may be resorted to within the spirit and scope of our invention.

What we claim is:

1. A glass furnace comprising, in combination, a melting compartment, a refining compartment, and means providing a passageway extending downward from the floor of the melting compartment and opening into the refining compartment.

2. A glass furnace comprising a melting tank, a refining tank, a partition between said tanks, and means providing a channel leading from the melting tank to the refining tank and passing beneath said partition, the upper wall of the channel beneath the partition being below the floor level of the melting tank.

3. A glass furnace comprising a melting tank and a refining tank separated by adjacent walls spaced apart to form a passage for the circulation of a cooling fluid, the floors of the tanks being at the same level, and a channel extending beneath said walls and uniting said compartments, the portion of the channel beneath said walls being entirely below the floor level of the furnace.

4. A glass furnace comprising, in combination, a melting compartment and a refining compartment having floors at substantially the same level, and means providing a passageway extending downward from the floor of the melting compartment to a position below the level of said floors and opening upwardly into the refining compartment.

5. A glass furnace comprising, in combination, a melting compartment and a refining compartment separated by vertical walls, and means providing a passageway extending downward from the floor of the melting compartment transversely beneath said walls and opening upwardly into the refining compartment, said passageway beneath the walls being entirely below the level of the floors of said compartments.

6. A glass furnace comprising a melting compartment and a refining compartment, a wall between said compartments projecting downward below the level of the floors of said compartments, and means providing a channel extending downward from the floor of the melting tank, beneath said wall and upwardly through the floor of the refining compartment, the roof of said passageway beneath said wall being below the level of said floors.

7. A glass furnace comprising a melting tank and a refining tank separated by adjacent vertical walls spaced apart to form a passage for the circulation of air between the tanks, the floors of the tanks being at substantially the same level, a metal water tank embedded between said walls, said tank and walls extending downward below the level of said floors, and means providing a channel extending downward through the floor of the melting tank transversely beneath said walls and metal tank and upwardly into the refining tank.

8. A glass furnace comprising a melting chamber and a refining chamber separated by adjacent walls spaced to provide a passageway for the circulation of air, said walls extending downward beneath the floor level of said chambers, a water tank between said walls and also extending downward below said floor level, means providing a channel extending downward through the floor of the melting chamber, transversely beneath said walls and tank and upwardly through the floor of the refining chamber, and refractory material interposed between the lower end of said water tank and the channel and forming the upper surface of the channel.

9. A glass furnace comprising a melting chamber, a refining chamber, and a throat connecting said chambers, said throat located below the level of the floors of said melting and refining chambers.

Signed at Toledo, Ohio.

WILLIAM K. BROWNLEE.
MICHAEL J. OWENS.

partment, the roof of said passageway beneath said wall being below the level of said floors.

7. A glass furnace comprising a melting tank and a refining tank separated by adjacent vertical walls spaced apart to form a passage for the circulation of air between the tanks, the floors of the tanks being at substantially the same level, a metal water tank embedded between said walls, said tank and walls extending downward below the level of said floors, and means providing a channel extending downward through the floor of the melting tank transversely beneath said walls and metal tank and upwardly into the refining tank.

8. A glass furnace comprising a melting chamber and a refining chamber separated by adjacent walls spaced to provide a passageway for the circulation of air, said walls extending downward beneath the floor level of said chambers, a water tank between said walls and also extending downward below said floor level, means providing a channel extending downward through the floor of the melting chamber, transversely beneath said walls and tank and upwardly through the floor of the refining chamber, and refractory material interposed between the lower end of said water tank and the channel and forming the upper surface of the channel.

9. A glass furnace comprising a melting chamber, a refining chamber, and a throat connecting said chambers, said throat located below the level of the floors of said melting and refining chambers.

Signed at Toledo, Ohio.

WILLIAM K. BROWNLEE.
MICHAEL J. OWENS.

DISCLAIMER 1,809,105.—*William K. Brownlee* and *Michael J. Owens*, Toledo, Ohio. FURNACE. Patent dated June 9, 1931. Disclaimer filed June 26, 1936, by the assignee of one-half interest, *Laclede-Christy Clay Products Company*.

Hereby disclaims from the scope of claims 1, 2, 3, 4, 5, 6, 7, 8, and 9 of said Letters Patent any and all glass-melting furnaces, except those in which the raw materials are introduced into the melting tank and melted by surface heat.

[*Official Gazette August 18, 1936.*]

DISCLAIMER 1,809,105.—*William K. Brownlee* and *Michael J. Owens*, Toledo, Ohio. FURNACE. Patent dated June 9, 1931. Disclaimer filed June 26, 1936, by the assignee of one-half interest, *Laclede-Christy Clay Products Company*.

Hereby disclaims from the scope of claims 1, 2, 3, 4, 5, 6, 7, 8, and 9 of said Letters Patent any and all glass-melting furnaces, except those in which the raw materials are introduced into the melting tank and melted by surface heat.

[*Official Gazette August 18, 1936.*]